June 19, 1945.   O. SANDBERG   2,378,796
TRAY FORMER FOR WRAPPING MACHINES
Filed Oct. 12, 1942   7 Sheets-Sheet 1
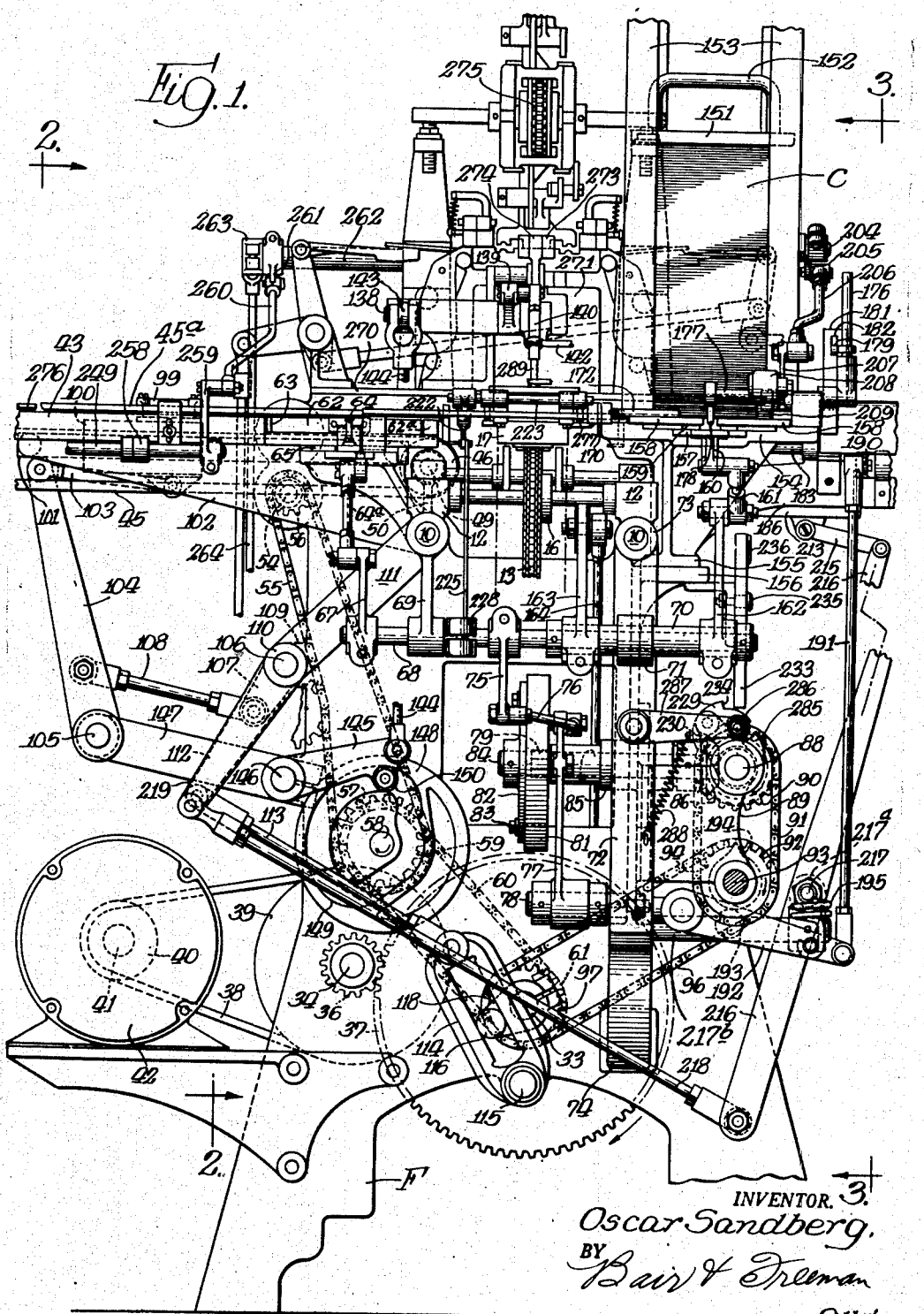
INVENTOR.
Oscar Sandberg,
BY Bair & Freeman
Attys.

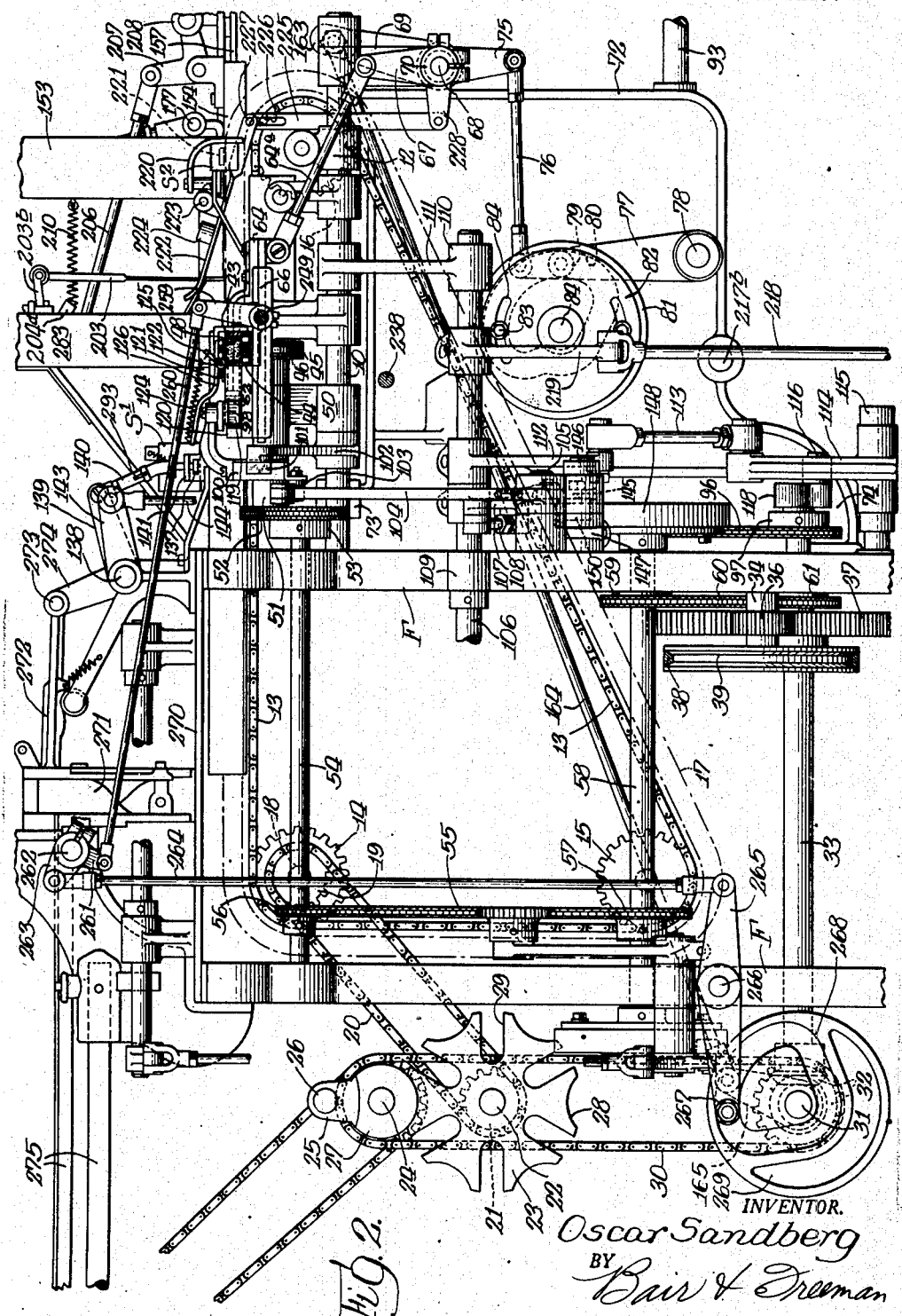

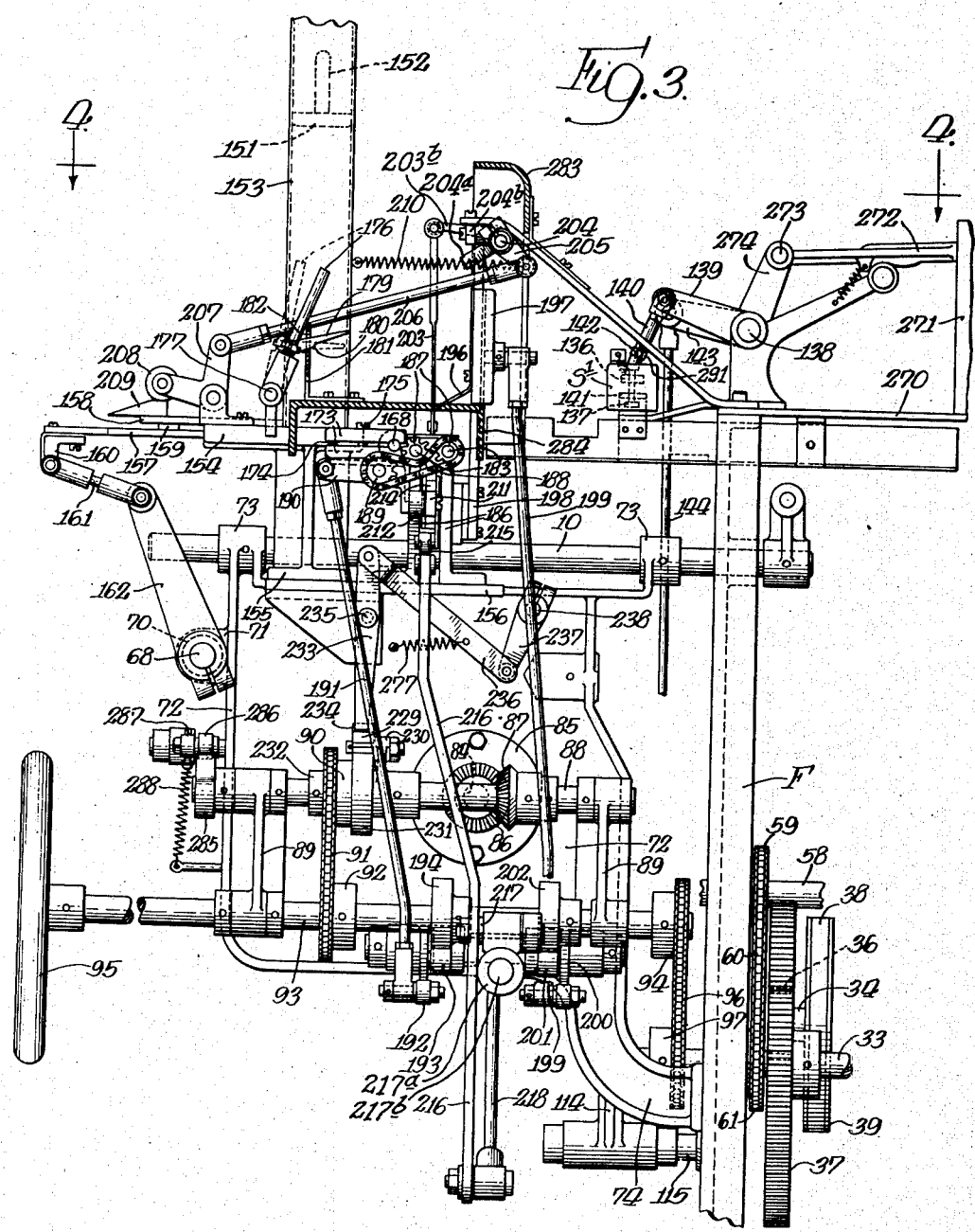

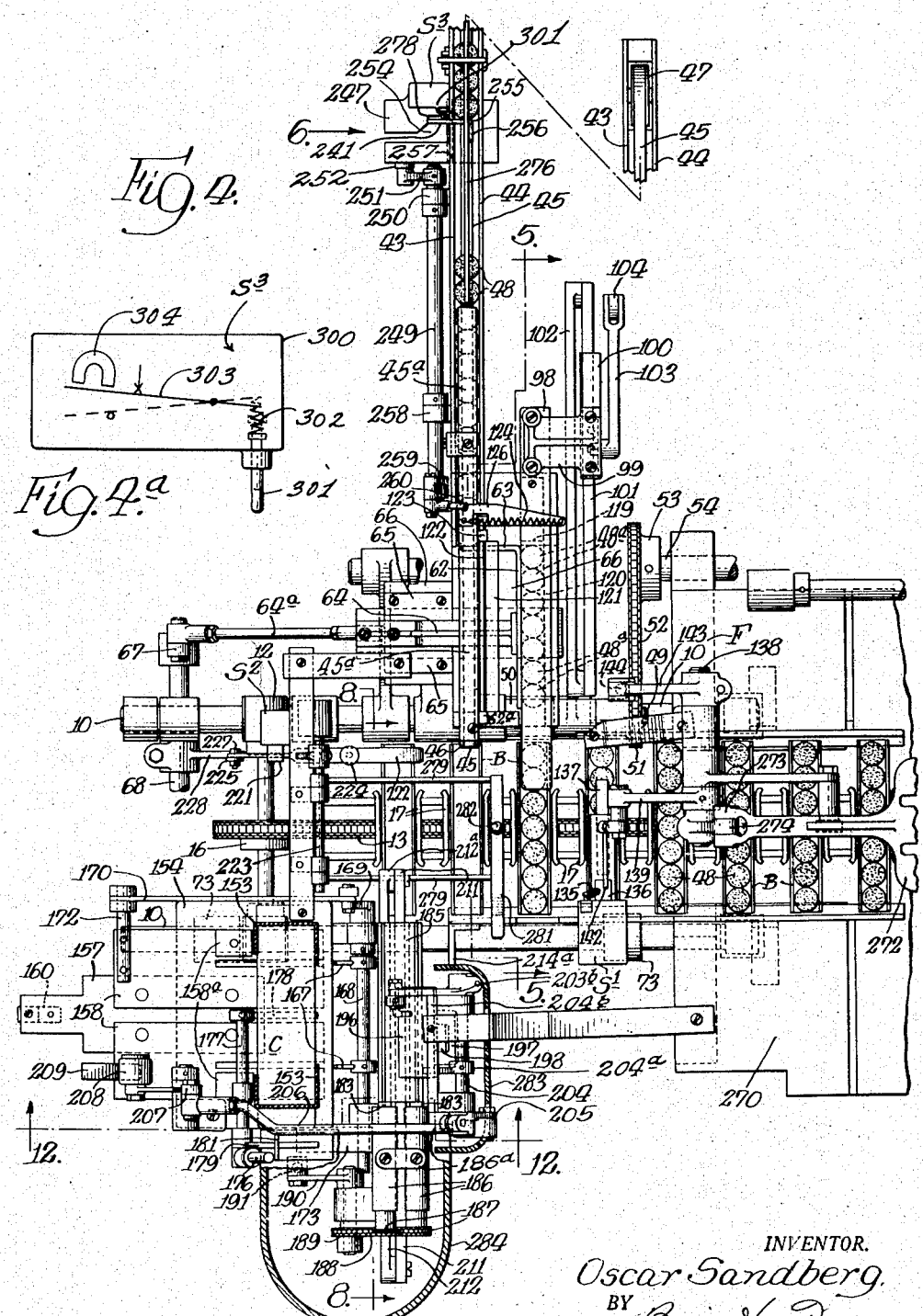

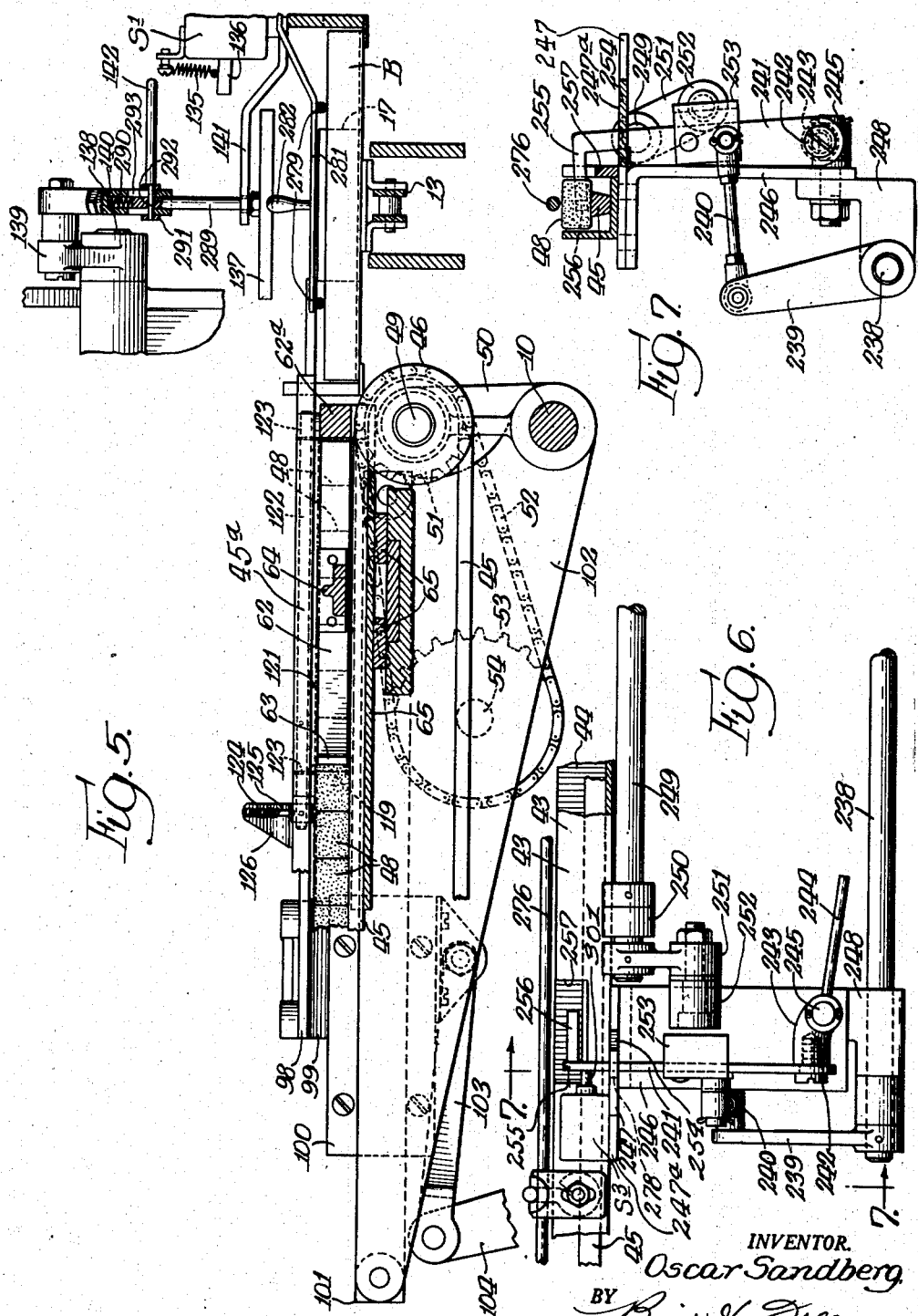

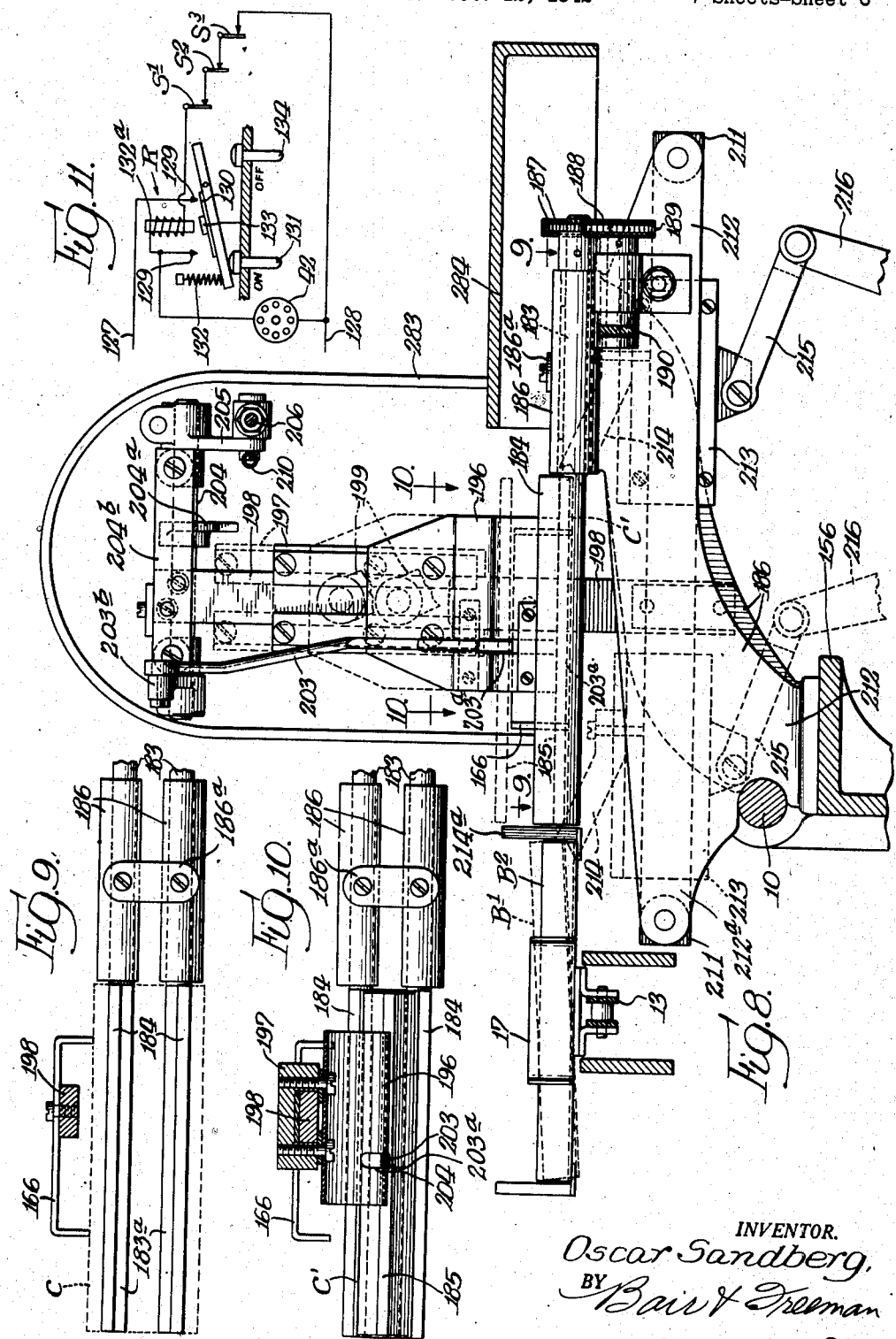

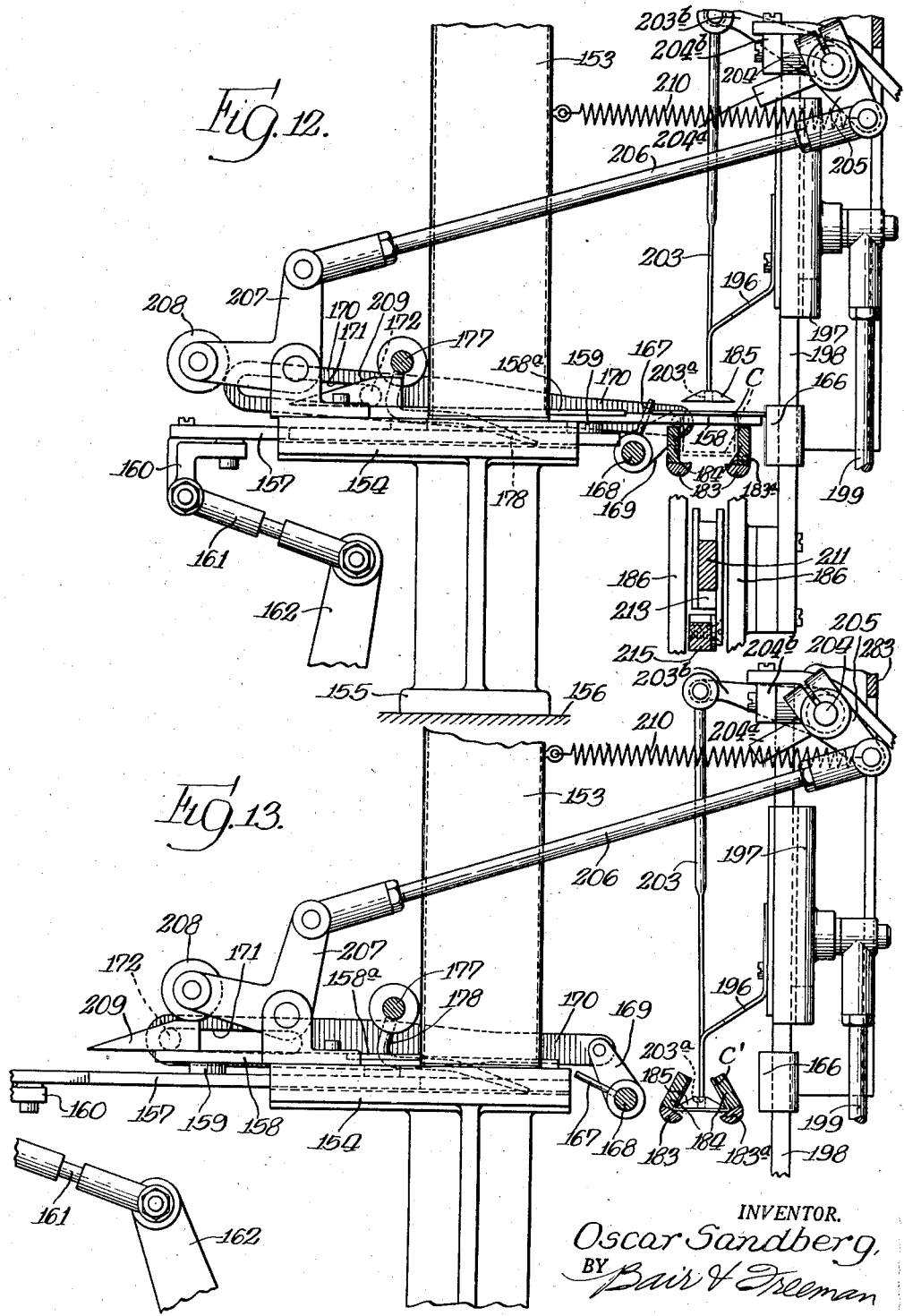

Patented June 19, 1945

2,378,796

UNITED STATES PATENT OFFICE 2,378,796

TRAY FORMER FOR WRAPPING MACHINES

Oscar Sandberg, Defiance, Ohio, assignor to Lynch Manufacturing Corporation, Defiance, Ohio, a corporation of Ohio Application October 12, 1942, Serial No. 461,709

18 Claims. (Cl. 93—51)

My present invention relates to tray forming mechanism for a piece of cardboard, the sides of which are bent up to form a "tray" or "boat" to contain pieces of candy or the like, the tray and candy then being both wrapped in a wrapper by a wrapping machine.

One object of the invention is to provide such tray forming mechanism for use in conjunction with article feeding mechanism wherein a feed conveyor is provided on which small pieces of candy may be placed to be conveyed in one direction toward a pocket conveyor, mechanism being provided for pushing a predetermined number of the pieces of candy laterally with respect to the feed conveyor and then again conveying them in a line parallel to the feed conveyor and into a pocket of the pocket conveyor.

Another object is to provide means for forming trays or "boats" of cardboard, one to be placed in each pocket of the pocket conveyor prior to the reception of the pieces of candy therein so that the pieces of candy are confined in the boat against assuming undesirable positions prior to being wrapped in the wrapping mechanism of a wrapping machine such as one of the type shown in my Patent No. 2,208,776, dated July 23, 1940, or my Patent No. 2,283,097, dated May 12, 1942.

Another object is to provide control mechanism for the candy pusher which pushes the candy laterally so that it is operated only if there is a sufficient supply of the pieces of candy on the feed conveyor.

Still another object is to provide switches controlling the drive motor for the wrapping machine and feed conveyor which stops the motor if there is no candy on the feed conveyor or in a pocket of the pocket conveyor.

Another object is to provide mechanism for automatically feeding a card to each pocket of the pocket conveyor from a stack of cards, each card going from the stack to a boat forming mechanism and being formed therein, and the boat then being fed into the pocket of the pocket conveyor.

Still a further object is to provide means for forming a flat card into a channel-shaped tray or boat and holding it in a proper position for feeding into the pocket of the pocket conveyor and insuring that it reaches the pocket in the desired shape for reception of the pieces of candy from the candy pusher assembly.

Still a further object is to provide a card hold-up assembly for holding the cards against feeding to the boat forming mechanism, if desired.

Still another object is to provide automatic switch mechanism responsive to the absence of a boat from any pocket for stopping the drive motor for the wrapping machine, card feeding and boat forming assemblies.

With these and other objects in view, my present invention consists in the construction, arrangement and combination of the various parts of my tray forming mechanism whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a rear elevation of a wrapping machine such as shown in my patents above mentioned, with the tray forming mechanism of my present invention applied thereto, parts of the mechanism being broken away at the sides of the figure;

Figure 2 is a left side elevation of the wrapping machine showing my tray forming mechanism applied thereto and illustrating it in section on the line 2—2 of Figure 1;

Figure 3 is a right side elevation of the boat forming mechanism in section, as taken on the line 3—3 of Figure 1;

Figure 4 is a plan view standing on the right side of the machine, with a pair of channel guides for boat forming cards and two guards of the machine shown in section;

Figure 4a is a diagrammatic plan view of a switch used in connection with my machine;

Figure 5 is an enlarged sectional view on the line 5—5 of Figure 4, illustrating portions of the candy pusher assembly and of a switch assembly operable in response to an absence of candy from a pocket of the pocket conveyor;

Figure 6 is a rear elevation on an enlarged scale showing a candy trip assembly, and the position of this assembly is indicated by the arrow 6 in Figure 4, the arrow, in turn, indicating the direction of observation for Figure 6;

Figure 7 is a sectional view of the candy trip assembly, as taken on the line 7—7 of Figure 6;

Figure 8 is an enlarged sectional view on the line 8—8 of Figure 4, showing the boat forming assembly of my present invention;

Figure 9 is a sectional view on the line 9—9 of

Figure 8, showing portions of the boat forming mechanism;

Figure 10 is a sectional view on the line 10—10 of Figure 8, showing further details of the boat forming mechanism, including a forming bar and a hold-down mechanism for the boat;

Figure 11 is an electro-diagrammatic view of a pair of control switches for the driving motor of the wrapping machine used in connection with my present mechanism;

Figure 12 is an enlarged sectional view on the line 12—12 of Figure 4, showing the card feeding and boat forming mechanism in operation; and Figure 13 is a view similar to Figure 12, showing another position thereof.

On the accompanying drawings I have used the reference character F to indicate generally a main frame of a wrapping machine. The frame F has a pair of rigid supporting rods 10 extending rearwardly therefrom and shown at about the center of Figure 1. The rods 10 support a pair of bearings 12 for a pocket conveyor, the chain of which is indicated at 13. The chain 13 passes around a drive sprocket 14 and a pair of idler sprockets 15 and 16. The pocket conveyor further includes a plurality of spaced channel-shaped pockets 17 to receive candy or other articles to be wrapped. For the present invention, they receive a plurality of pieces of candy to be wrapped in a common wrapper.

The drive sprocket 14 is mounted on a shaft 18 having thereon a sprocket 19. The sprocket 19 is operatively connected by a chain 20 with a sprocket 21 on an intermittently rotating shaft 22. The shaft 22 is suitably journaled on the main frame F and has mounted thereon a star wheel 23 for driving the shaft. The star wheel 23 is driven by a continuously rotating shaft 24 having an arm 25 provided with a drive pin 26 to coact with the slots 29 of the star wheel 23 in the usual well-known manner. The arm 25 is mounted on a disk 27 which coacts with concave notches 28 in the periphery of the star wheel 23 to retain the star wheel against rotation except while the pin 26 is engaged in one of the slots 29 of the star wheel.

The shaft 24 is driven by a chain 30 from a shaft 31. The shaft 31, in turn, is driven by a pair of meshing bevel gears 32 from a shaft 33. The shaft 33 may be termed a main shaft, and it is driven from an idler shaft 34 by a pinion 36 and a gear 37. The shaft 34 is driven by a belt 38 passing around a large pulley 39 on the shaft 34 and a small pulley 40 on a motor shaft 41 of a drive motor 42.

My article feeding mechanism includes a feed conveyor comprising a pair of side bars 43 and 44 and a belt 45, the belt forming a bottom for the feed conveyor. The belt 45 passes around a drive pulley 46 above the left hand rod 10 and an idler pulley 47 at the outer end of the feed conveyor. The feed conveyor is preferably two or three feet long to give plenty of space for an operator to place pieces of candy 48 therein. The inner end of the feed conveyor has a candy hold-down bar 45ᵃ, spaced above the belt 45.

For rotating the drive pulley 46 I provide a shaft 49 journaled in a bearing 50 mounted on the left hand rod 10. The shaft 49 has mounted thereon a small sprocket 51 connected by a chain 52 with a large sprocket 53. The sprocket 53 is mounted on a shaft 54 journaled in the frame F and driven at its forward end by a chain 55 (see Figure 2). The chain 55 passes around a sprocket 56 of the shaft 54 and around a sprocket 57 of a countershaft 58. The countershaft 58 is journaled in the frame F and is driven by a sprocket 59, a chain 60 and a sprocket 61 from the main shaft 33. The proportion and sizes of the parts 46, 51, 53, 56, 57, 59 and 61 are such that the belt 45 is driven at a somewhat higher speed than required for feeding the proper number of pieces of candy 48 to the pockets 17 so as to always insure a sufficient supply therefor, the belt merely slipping under the pieces of candy when they are halted, as will hereinafter be described.

A certain number of pieces of candy 48 are adapted to be fed into each pocket 17. In the illustrated instance each pocket receives seven pieces of candy. In order to segregate these seven pieces from the row of candy in the feed conveyor 43—44—45, I provide a candy stop 62ᵃ for the foremost piece of candy and a pusher assembly including a first pusher bar 62 for pushing the candy laterally (or forwardly with respect to the operator) from a position in line with the feed conveyor and under the candy hold-down bar 45ᵃ, to the position illustrated by dotted lines as 48ᵃ, just ahead of this bar at the center of Figure 4. The bar 62 has a right-angled candy holding portion 63 to hold the row of candy in the feed conveyor from undesirable feeding while the pusher bar 62 is in its forward position.

The pusher bar 62 is mounted on a slide member 64 which is suitably guided in a pair of slideways 65 mounted on a candy feed plate 66 onto which the candy is fed from between the conveyor sides 43 and 44, and which supports the candy while being pushed from its rearward position to its forward position.

For operating the slide member 64 I provide a link 64ᵃ pivoted to an arm 67 which, in turn, is secured to a rock shaft 68. The shaft 68 is journaled in a bearing bracket 69 extending downwardly from the left hand supporting rod 10 and in a sleeve 70 which, in turn, is journaled in a bearing boss 71 forming part of a side frame member 72 (see Figure 3). The side frame member 72 has a pair of bosses 73 receiving the right hand supporting rod 10 and has a foot 74 secured to one of the frame members F.

The rock shaft 68 is rocked by an arm 75 depending therefrom and connected by a link 76 with an arm 77. The arm 77 is pivoted at 78 to the side frame 72 and carries a roller 79. The roller 79 is received in a cam groove 80 of a cam disk 81. The cam disk 81 is secured to a drive disk 82 by clamp screws 83 passing through arcuate slots 84 of the drive disk so that the position of the cam may be adjusted for timing the oscillations of the pusher bar 62 with relation to the other operating parts of the article feeding mechanism.

The drive disk 82 is mounted on a shaft 84 journaled in a bearing 85 of the side frame 72 and carries a bevel gear 86. The bevel gear 86 meshes with a bevel gear 87 on a countershaft 88. The countershaft 88 is journaled in bearing brackets 89 secured to the side frame 72, and, in turn, is driven by a sprocket 90 and a chain 91 from a sprocket 92. The sprocket 92 is mounted on a countershaft 93 having at one end a sprocket 94 and at its other end a hand wheel 95. The sprocket 94 is driven by a chain 96 from a sprocket 97. The sprocket 97 is mounted on the main drive shaft 33.

After the seven pieces of candy are pushed laterally from the feed conveyor (forwardly in the machine) by the pusher bar 62, they are then pushed in a direction parallel to the length of the feed conveyor into one of the pockets 17 onto a boat B therein. The boat B is a channel-shaped piece of cardboard formed into a tray, as will hereinafter appear. The candy pusher now under consideration comprises a longitudinally movable push bar 98 (see Figure 4) secured by a bracket 99 to a cross-head 100. The cross-head 100 is slidable on a guide bar 101 secured at its opposite ends to a triangular shaped bracket 102. The bracket 102 is secured to the left hand supporting rod 10.

The cross-head 100 is slid along the guide bar 101 by a link 103 pivoted to the upper end of an arm 104. The arm 104 is pivoted on a stud shaft 105, and oscillating movement is impaired to it from a rock shaft 106 by an arm 107 thereon and a link 108. The link 108 is pivoted to the arms 104 and 107. The rock shaft 106 is journaled in a bearing 109 of one of the frame members F and in a bearing 110 of a rigid arm 111 secured to the left hand supporting rod 10.

Rocking movement is imparted to the rock shaft 106 by an arm 112, a link 113 and a slotted arm 114. The arm 114 is pivoted to a stud 115 projecting from one of the frame members F. A crank pin 116 of a crank 118 travels in the slot of the arm 114, the crank being secured to the main shaft 33. The rocking motion imparted to the rock shaft 106 is accordingly faster in a return direction than in the forward direction when it pushes the pieces of candy into the boat in the pocket of the pocket conveyor.

The second push bar 98 is provided with a flange 119 adapted to engage the rearmost piece of candy and push the row of seven pieces into the boat B in the pocket 17. The pieces of candy 48 at this time are confined between the first push bar 62 and a bar 120 forming a front wall of a trough to guide the pieces of candy into the boat. Before the push bar 62 operates, it assumes a position in alignment with the feed conveyor side 43, and a gate 121 forms a second side in alignment with the conveyor side 44 so as to keep the pieces of candy in alignment as they are pushed toward the right in Figure 1 by the conveyor belt 45 onto the feed plate 66. The gate 121 is secured to a shaft 122 journaled in bearings 123. The gate is normally constrained to lowered position by a spring 124 connected at one end to a pin 125 extending upwardly from the rock shaft and at its other end to a stationary bracket 126. As the push bar 62 moves forwardly it pushes the seven pieces of candy against the gate 121 to lift it to the position shown in Figure 4, and it remains in this lifted position until the push bar 62 is pulled back again by the link 64ª to its initial position in alignment with the feed conveyor side 43.

In Figure 11 I have illustrated a control circuit for the motor 42. Feed wires 127 and 128 are connected with a source of current supply and a starting relay R is provided for controlling the motor 42. The starting relay R includes a pair of contacts 129 and a bridging contact 130. The contact 130 may be engaged with the contacts 129 by pushing an "on" button 131 against the bias of a spring 132. Thereupon, a holding circuit is established from the wire 127 across the contacts 129—130—129 and through three switches $S^1$, $S^2$ and $S^3$ to the other side of the line 128. This circuit includes an electromagnet 132ª for holding an armature 133 attracted so that the circuit, through its bridging contact 130, when once closed by pushing the "on" button of the relay, will remain closed providing the switches $S^1$, $S^2$ and $S^3$ are closed. If either of the switches opens, then the holding circuit is broken and the spring 132 opens the circuit through the relay. The circuit may also be opened by hand by pushing an "off" button 134.

The switches $S^1$ and $S^3$ will now be described in relation to the candy feeding mechanism, and the switch $S^2$ will be later described in connection with the boat forming mechanism. The switch $S^1$ is shown in Figures 2, 3, 4 and 5. It is normally closed, due to the bias of a spring 135 connected with an insulating extension 136 of the switch arm. Each time a pocket 17 assumes a position aligned with a candy striker bar 137, the striker bar is lowered by the rocking action of a rock shaft 138. The rock shaft 138 has an arm 139 mounted thereon, and pivoted to the arm is a link 140. A rod 289 is telescopically mounted in the link 140 and carries the candy striker bar 137. The rod 289 is slidable through a bracket 141. A finger 142 projects from the rod 289 and is adapted, under certain circumstances, to strike the extension 136 of the switch $S^1$ for opening the circuit through the switch. The rod 142 has a reduced extension 292 through a collar 291, through slots 293 in the link 140 and through the rod 289 to connect the rods 142 and 289 together. A spring 290 in the link 140 biases the rod 289 toward its lowermost limit of movement, the purpose of which will hereinafter appear.

For rocking the shaft 138 in proper timed relation to the rest of the mechanism it is provided with an arm 143. The arm 143 is connected by a link 144 to an arm 145 pivoted on a stud shaft 146 extending from one of the frame members F. This shaft also carries an arm 147 for bracing the shaft 105 (see Figure 1). The arm 145 is rocked by a cam 148 having a cam groove 149 in which a roller 150 of the arm 145 travels. The cam 148 is mounted on the shaft 58.

The plate 247 has an extension 247ª on which is mounted the switch $S^3$. The operating mechanism of the switch $S^3$ is shown diagrammatically in Figure 4a. It comprises a housing 300 from which projects an actuating pin 301. The pin 301, through a spring 302, actuates a switch arm 303 which is biased to closed circuit position by a permanent magnet 304. When the pin 301 is pushed inwardly enough to compress the spring 302 to such an extent that it overcomes the pull of the magnet 304 on the switch arm 303, the switch arm snaps to open circuit position such as shown by dotted lines. The coaction of the switch $S^3$ with the operating mechanism of the machine will be later described.

The cards for forming the boats B are indicated at C. They are preformed in rectangular shape of cardboard and arranged in a stack with a weight 151 placed on them. The stack of cards C has the ends of the cards confined for vertical movement between a pair of channel-shaped guides 153. The weight 151 is provided with a handle 152 for convenience in removing the weight when replenishing the stack of cards.

The guide channels 153 are secured to a bracket 154 having a foot 155 secured to a shelf 156 of the side frame 72. The bracket 154 carries a slide plate 157 above which is secured a pair of slide plates 158. Spacers 159 serve as part of the connection between the plate 157 and the plates 158. The slide plates 158 have secondary plates 158ª mounted thereon, the forward edges of which serve as shoulders to engage only the bottom-most card C and move it forwardly when the slide plate 157 is slid forwardly.

For sliding the plate 157 forwardly, a bracket 160 is secured thereto, and the bracket is connected by a link 161 to an arm 162. The arm 162 is secured to the sleeve 70 (see Figure 1), and the sleeve, in turn, is oscillated by an arm 163 secured thereto. The arm 163 is connected by an elongated link 164 with a a crank arm 165 mounted on the cross-shaft 31 at the front of the machine (see Figure 2). Rotation of the shaft 31 thereby rocks the sleeve 70 for sliding the slide plates 157, 158 and 158ª forwardly from the position of Figure 13 to the position of Figure 12.

The shoulders formed by the front edges of the secondary plates 158ª slide the card C part way to the position shown in Figure 12, and the card is slid the rest of the way to a position against a stop 166 by a pair of pins 167 mounted on a rock shaft 168 which is rocked by an arm 169 and a link 170. The link 170 is provided with a slot 171 which receives a rod 172 secured to the left hand slide plate 158. The pins 167 are accordingly shifted from the position of Figure 13 to the position of Figure 12 at the end of the forward stroke of the slide plates 157, 158 and 158ª after the rod 172 reaches the forward end of the slot 171. The motion is such as to swing the pins 167 faster than the slide plates travel so as to move the card C away from the forward edge of the secondary plate 158ª to the position illustrated in Figure 12.

In order to keep the card C in this position during a subsequent folding operation, the slot 171 permits the pin 172 to move backwardly with the slide plates 157, 158 and 158ª, leaving the pins 167 in the position of Figure 12. A brake is provided for the rock shaft 168 in the form of a pair of bars 173 (see Figure 3) suitably held against rotation and frictionally engaging the rock shaft under the action of a spring 174. The tension may be adjusted by a screw 175 about which the bars 173 may slightly pivot to be retained in engagement with the rock shaft by the spring. When the rod 172 closely approaches its fully retracted position it picks up the rear end of the slot 171 and swings the pins 167 rearwardly to the position of Figure 13. By this time, however, the forming mechanism has received the card C and there is no further need for holding it against retracting.

Whenever the operator wishes to prevent the cards C from being fed into the wrapping machine a lever 176 (see Figure 3) may be swung from its full-line position to its dotted line position. The lever 176 is secured to a rock shaft 177 which has a card lifting rod 178 fixed thereto. The rod 178 normally assumes an out-of-the-way position, as shown in Figures 12 and 13, whereas movement of the lever 176 to the dotted position of Figure 3 raises the rod 178 to lift the stack of cards C. The lifting rod 178 is then retained in the raised position by a pawl 179 pivoted to the lever 176 and having a latch shoulder 180 which drops by gravity behind a bracket 181. The latch 179 is slidable through a slot 182 of the bracket 181 and may be released by lifting the latch shoulder 180 from engagement with the bracket.

The card C, after it is released by retraction of the slide plates 158, drops down on the edges of a pair of bars 184 welded to half cylindrical portions of a pair of boat former rock shafts 183. A forming bar 185 pushes the card C between the bars 184 to form the card into the dotted shape of Figure 12, and the bars 184 are then swung inwardly to the position shown in Figure 13 to bend the card C to the shape illustrated at C'. The cards C may be longitudinally scored before they are supplied to the channel guides 153 to facilitate the bending of the cards by the boat forming elements 183, 184 and 185 into the shape C'.

The boat former rock shafts 183 are journaled in a pair of bearing brackets 186 connected by a link 186ª and each secured to the shelf 156 of the side frame 72 (see Figures 3 and 8). On the outer ends of the rock shafts 183 I provide sprockets 187 (see Figure 3). A chain 188 extends around these sprockets in such manner as to rotate them in opposite directions when the chain is oscillated. For oscillating the chain it extends around a sprocket 189 connected with an arm 190. The arm 190 is swung by a link 191 connected with a rock arm 192. The rock arm 192 is provided with a roller 193 contacting a cam 194 on the shaft 93. The roller 193 is retained in contact with the cam by a spring 195, the lower end of which is illustrated in Figure 1 and the upper end of which is suitably secured to a stationary bracket (not shown).

The boat forming bar 185 is carried by a bracket plate 196 secured to a cross-head 197 vertically slidable on a stationary guide bar 198. Vertical reciprocations are imparted to the crosshead 197 by means of a link 199 pivoted thereto and extending downwardly to a rock arm 200 pivotally mounted on the side frame 72 and carrying a roller 201 similar to the roller 193. The roller 201 contacts with a cam 202 also mounted on the shaft 93 with the cam 194. The arm 200 is biased toward engagement of its roller 201 with the cam 202 by means of a spring (not shown) similar to the spring 195.

In order to hold the card C' against upward movement when the boat forming bar 185 is disengaged therefrom, a holddown link 203 is provided (see Figure 13) which may extend through a slot 203ª of the boat forming bar and a notch 204ª of the bracket plate 196. The link 203 keeps the card C' against shoulders 183ª of the rock shafts 183 while the boat forming bar 185 is raised, the rock shafts rotating outwardly again from the position of Figure 13 to the position of Figure 12 during the retraction of the boat forming bar. This permits the card C' to open out to a channel shape with the flanges substantially normal to the web of the tray or boat to properly form it to receive the pieces of candy 48.

For operating the hold-down link 203 a rock shaft 204 and an arm 203ᵇ are provided. The shaft 204 is journaled on the stationary bar 198 and is provided with an arm 205 connected by a link 206 with a bell crank 207. The bell crank 207 carries a roller 208 for coaction with a cam block 209 on the left hand slide plate 158. Accordingly, movement of the slide plate, as from the position of Figures 3 and 13 to the position of Figure 12, drops the roller 208 and thereby permits the link 203 to be raised by action of a spring 210 and stopped in raised position by an arm 204ª engaging a stationary frame bar 204ᵇ. When the slide plate 158 moves to the Figure 13 position, the cam 209 raises the roller 208 and thereby lowers the hold-down link 203. The holddown link remains lowered until after the boat forming bar 185 has been raised so as to secure the proper timing for the hold-down link with respect to the movement of the boat forming bar.

After the boat B is formed, and while the pocket conveyor 13 is stopped in position with a pocket 17 aligned with the rock shafts 183, the cross-bar 281 has a handle 282 thereon, and the cross-bar and handle serve as a weight to hold the boats in the pockets. The handle may also be utilized to raise the rods 279 to gain access to the first two pockets of the pocket conveyor for the purpose of removing a damaged boat therefrom.

Suitable guards are provided to cover the operating mechanism, two of which are shown at 283 and 284 in Figure 4. The guard 283 is also shown in Figures 3 and 8.

In connection with the clutch 229—231, I provide a booster cam 285 with which a roller 286 coacts. The roller 286 is mounted on a pivoted arm 287 and is constrained to engage the cam 285 by a spring 288. The elements 285, 286, 287 and 288 are best shown in Figures 1 and 3. When the shoulder 234 of the pawl 229 engages the stop lever 233, the roller 286 passes over the lobe of the cam 285 and stops the rotation of the shaft 88 in a desired position without undue over-run. When it is desirable to slowly rotate the mechanism for making adjustments or removing damaged boats or pieces of candy, it may be rotated, as desired, by the use of the hand wheel 95.

From the foregoing disclosure it will be obvious that I have provided a feeding mechanism for feeding articles in groups to the wrapping mechanism of a wrapping machine, and have made provision for stopping the machine in the absence of holders (such as boats) for the articles or in the absence of the articles themselves. I have also provided a means to control the operation of the machine in response to the number of articles in the feed conveyor so that there is no unnecessary operation when articles are lacking, and no possibility of placing in one of the boats, less than the required number of articles to fill the package.

Some changes may be made in the construction and arrangement of the parts of my boat forming for wrapping machines without departing from the real spirit and purpose of my invention, and it is my intention to cover by my claims any modified forms of structure or use of mechanical equivalents which may be reasonably included within their scope without sacrificing any of the advantages thereof. The claims hereto appended are drawn to the boat forming and feeding mechanism described in the foregoing specification, whereas claims directed to the article feeding mechanism thereof will be found in my co-pending application Serial No. 452,444, filed July 27, 1942.

I claim as my invention:

1. In a tray forming mechanism for wrapping machines, a card hopper adapted to receive a stack of cards, card shaping mechanism thereadjacent, means for pushing the lowermost card of said stack of cards from said card hopper to a position above said card shaping mechanism, said card shaping mechanism comprising a pair of rock shafts having L-shaped seats and a card depressing means for engaging a card and forcing it into said seats whereby it is formed into a channel-shaped tray therein, means for thereupon rocking said rock shafts to bend the flanges of said channel-shaped tray to inclined positions, and means for moving the tray thus formed from said card shaping mechanism.

2. In a tray forming mechanism for wrapping machines, a card hopper, card shaping mechanism there adjacent, means for pushing a card from said card hopper to position in said card shaping mechanism. Said card shaping mechanism comprising a pair of seats and a card depressing means for engaging a card and forcing it into said seats whereby it is formed into a channel-shaped tray therein, and means for moving the tray thus formed endwise from said card shaping mechanism.

3. In a tray forming mechanism for wrapping machines, a card hopper adapted to receive a stack of cards, card shaping mechanism adjacent said card hopper, means for pushing the lowermost card of said stack of cards from said card hopper to a position above said card shaping mechanism means for preventing return of said card with said pusher means as the pusher means returns for another card, said card shaping mechanism comprising a pair of rock shafts having seats therein and a card depressing means for engaging a card and forcing it into said seats whereby it is formed into a channel-shaped tray therein, said rock shafts thereupon rocking to bend the flanges of said channel-shaped tray to an inclined position, means engaging the web of said tray to hold it in said seats while said card depressing means recedes from said web, and means for moving the tray thus formed from said card shaping mechanism.

4. In a tray forming mechanism for wrapping machines a card hopper adapted to receive a stack of cards, card shaping mechanism adjacent said card hopper, means for pushing the lowermost card of said stack of cards from said card hopper to a position above said card shaping mechanism, said card shaping mechanism comprising a pair of rock shafts having seats therein and a card depressing means for engaging a card and forcing it into said seats whereby it is shaped channel-shaped therein, said rock shafts thereupon rocking to bend the flanges of said channel-shaped card to an inclined position.

5. A card forming mechanism comprising a tray hopper adapted to receive a stack of cards, card shaping mechanism adjacent said card hopper, means for periodically pushing a lowermost card of said stack of cards from said card hopper to a position for being formed in said card shaping mechanism, an oscillating shaft having a finger for preventing return of said card with said pusher means as the pusher means returns for another card, said card shaping mechanism comprising a pair of rock shafts having L-shaped seats and a card depressing means for engaging a card and forcing it into said seats whereby it is shaped channel-shaped therein, said rock shafts thereupon rocking to incline the flanges of said channel-shaped card toward each other, means engaging the web of said channel-shaped card to hold it in said seats while said card depressing means recedes from said web, and means for discharging the card thus formed from said card shaping mechanism.

6. A tray forming mechanism comprising a card hopper adapted to receive a stack of cards, card shaping mechanism thereadjacent, means for periodically pushing a lowermost card of said stack of cards from said card hopper to a position for being shaped in said card shaping mechanism, said card shaping mechanism comprising a pair of seats and a card depressing means for engaging a card and forcing it into said seats whereby it is shaped channel-shaped therein, and means for endwise discharging the card thus shaped from said card shaping mechanism.

7. A tray forming mechanism comprising a card hopper adapted to receive a stack of cards, card shaping mechanism thereadjacent, means for periodically pushing a lowermost card of said stack of cards from said card hopper to a position for being shaped in said card shaping mechanism, an oscillating shaft having a finger for preventing return of said card with said pusher means as the pusher means returns for another card, a lost motion connection for operating said oscillating shaft, friction means coacting with said oscillating shaft to prevent excessive movement thereof, said card shaping mechanism comprising a pair of seats and a card depressing means for engaging a card and forcing it into said seats whereby it is shaped channel-shaped therein, and means for discharging the card thus shaped from said card shaping mechanism.

8. In a tray forming mechanism for wrapping machines, a card hopper adapted to receive a stack of cards, card shaping mechanism adjacent said card hopper, means for feeding a card from said stack of cards to said car shaping mechanism, means for preventing return of said card with said card feeding means as the feeding means returns for another card, said card shaping mechanism comprising a pair of rock shafts having L-shaped seats and a card depressing means for engaging a card and forcing it into said seats whereby it is shaped channel-shaped therein, said rock shafts thereupon rocking to bend the flanges of said channel-shaped card toward each other, means engaging the web of said channel-shaped card to hold it in said seats while said card depressing means recedes from said web, and means for discharging the tray thus formed from said card shaping mechanism.

9. In a tray forming mechanism for wrapping machines, a card hopper adapted to receive a stack of cards, card shaping mechanism adjacent said card hopper, means for feeding a card from said stack of cards to said card shaping mechanism, said card shaping mechanism comprising a pair of rock shafts having seats and a card depressing means for engaging a card and forcing it into said seats whereby it is formed into a channel-shaped tray therein, said rock shafts thereupon rocking to bend the flanges of said channel-shaped tray toward each other, and means for discharging the tray thus formed from said card shaping mechanism.

10. In a tray forming mechanism for wrapping machines, a card hopper adapted to receive a stack of cards, card shaping mechanism thereadajacent, means for feeding a card from said stack of cards to said card shaping mechanism, means for preventing return of said card with said card feeding means as the feeding means returns for another card, said card shaping mechanism comprising a pair of rock shafts having L-shaped seats and a card depressing means for engaging a card and forcing it into said seats whereby it is formed into a channel-shaped tray therein, said rock shafts thereupon rocking to bend the flanges of said tray toward each other, means engaging the web of said tray to hold it in said seats while said card depressing means recedes from said web, and means for operating said card feeding means, said rock shafts, said card depressing means, said web engaging means and said card discharging means in synchronism.

11. In a tray forming mechanism for wrapping machines, a card hopper adapted to receive a stack of cards, card shaping mechanism thereadjacent, means for feeding a card from said stack of cards to said card sh ng mechanism, said card shaping mechanism nprising a pair of rock shafts having seats and card depressing means for engaging a card and forcing it into said seats whereby it is formed into a channel-shaped tray therein, said rock shafts thereupon rocking to bend the flanges of said tray toward each other, and means for discharging the tray thus formed from said card shaping mechanism, said card feeding means, said rock shafts, said card depressing means and said card discharging means being operated in synchronism with each other.

12. A tray forming mechanism for wrapping machines comprising a card hopper adapted to receive a series of cards, means for delivering the cards one at a time to a tray forming station, card shaping mechanism at said station for shaping said card into a substantially channel-shaped tray, means for moving the trays longitudinally from said card shaping mechanism, and manually operated means for supporting the cards in said card hopper to prevent them from being extracted therefrom by said delivering means and formed into trays.

13. A tray forming mechanism for wrapping machines comprising a card hopper adapted to receive a series of cards arranged in a stack, means for extracting cards from said stack of cards for shaping them into substantially channel-shaped trays, means for feeding the trays after they are formed from tray forming position, and manually operated means for supporting the stack of cards in the card hopper to prevent them from being extracted therefrom and formed into trays, said last means supporting the stack so that said extracting means cannot coact therewith for moving the cards to the card shaping station.

14. A tray forming mechanism for wrapping machines comprising a card hopper adapted to receive a series of cards arranged in a stack, means for extracting cards from said stack of cards, means for shaping them into substantially channel-shaped trays, means for removing the trays after they are formed from said shaping means, and manually operated means for supporting the stack of cards in the card hopper to prevent them from being extracted therefrom and formed into trays, said last means supporting the stack so that said extracting means cannot coact therewith for moving the cards to the tray forming station.

15. A tray forming mechanism for wrapping machines comprising a card hopper adapted to receive a series of cards arranged in a stack, means for extracting cards from said stack of cards, means for shaping them into substantially channel-shaped trays, means for removing the trays from said card shaping means after they are formed, and means for operating said tray forming mechanism after and only when a tray has been removed from said card shaping means.

16. Mechanism for forming boats to receive articles fed to a wrapping machine comprising a card hopper adapted to receive a stack of cards, a pusher member for extracting said cards one at a time from said card hopper, boat forming mechanism comprising a pair of angle-shaped members, said pusher member pushing said cards to a position above said angle-shaped members and thereafter lowering them to be supported by the angle-shaped members, means for forcing said cards into said angle-shaped members thereby shaping the cards into channel-shaped formation, means for rocking said angle-shaped members to over-bend the sides of said channel-shaped members whereby said card tends to thereafter remain in channel shape, a second pusher member for pushing the channel-shaped members from card shaping position, gravity operated means to hold the boats in filling position while being filled with articles, a second gravity operated means engageable with each boat, a control device for the operating means for said boat forming mechanism, said second gravity operated means, when there is no boat in filling position, striking said control device for stopping said operating means for said boat forming mechanism.

17. Mechanism for forming boats to receive articles fed to a wrapping machine comprising a card hopper, means for extracting cards one at a time therefrom and shaping the cards into boats, means for pushing the boat-shaped card from shaping position to a filling position, holding means to hold the boats in the filling position while being filled with articles, control means engageable with each boat after it enters filling position, a switch for operating said card shaping means and normally energizing the same, said control means, when there is no boat in filling position, striking said switch for stopping said card shaping mechanism.

18. Mechanism for forming boats to receive articles fed to a wrapping machine comprising a card hopper, means for extracting cards one at a time therefrom and shaping the cards into boats, means for pushing the boat-shaped card to a filling position, control means engageable with each boat in such position, a switch for operating said boat forming mechanism and normally energizing the same, said control means, when there is no boat in filling position, striking said switch for stopping said boat forming mechanism.

OSCAR SANDBERG.